United States Patent
Di Pardo

(10) Patent No.: US 7,851,723 B2
(45) Date of Patent: Dec. 14, 2010

(54) ELECTRIC SPOT WELDING HEAD

(75) Inventor: Massimo Di Pardo, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 951 days.

(21) Appl. No.: 11/683,151

(22) Filed: Mar. 7, 2007

(65) Prior Publication Data

US 2007/0210033 A1    Sep. 13, 2007

(30) Foreign Application Priority Data

Mar. 8, 2006    (EP)    .................................. 06425154

(51) Int. Cl.
B23K 9/28    (2006.01)
(52) U.S. Cl. ...................... 219/86.25; 219/86.1; 219/90
(58) Field of Classification Search ................ 241/86.1, 241/86.25, 90, 137.9
See application file for complete search history.

(56) References Cited

U.S. PATENT DOCUMENTS

| | | | |
|---|---|---|---|
| 2,491,169 A | 12/1949 | Early et al. | |
| 4,208,566 A | 6/1980 | Eghammer et al. | |
| 4,237,365 A * | 12/1980 | Lambros et al. | ............. 219/139 |
| 4,973,813 A * | 11/1990 | Mitchell | ..................... 219/109 |
| 5,616,969 A * | 4/1997 | Morava | ......................... 307/91 |
| 2003/0089684 A1 | 5/2003 | Beauregard et al. | |
| 2004/0195213 A1* | 10/2004 | Angel | ..................... 219/86.25 |
| 2004/0206526 A1* | 10/2004 | Rashid | ..................... 174/35 R |
| 2007/0119069 A1* | 5/2007 | Shim | ............................. 34/96 |

FOREIGN PATENT DOCUMENTS

| | | | |
|---|---|---|---|
| JP | 60255286 A | * | 12/1985 |
| JP | 62081276 A | * | 4/1987 |
| JP | 62310383 | | 6/1989 |
| WO | WO2005115673 A2 | | 5/2005 |

OTHER PUBLICATIONS

XP 002392804—Focus on BIA's Work, Berufsgenossenschaftliches Institut for Arbeitsschutz, No. 0213, Electromagnetic Fields on Hand Held Spot-Welding Guns, 617.0-BIA: 638.25, HVBG.
European Search Report from EP Application No. 06425154.9 dated Oct. 2, 2006.

* cited by examiner

*Primary Examiner*—Stephen J Ralis
(74) *Attorney, Agent, or Firm*—Heslin Rothenberg Farley & Mesiti P.C.; Victor A. Cardona

(57) ABSTRACT

A spot welding head includes an electrical conductor guided into a tubular sheath whose ends are rigidly connected to rear ends of supporting bodies of several electrodes. The sheath defines a substantially stiff loop portion configured and arranged so as to be substantially parallel and to face an annular path defined by the electrodes and the supporting bodies, in such a way that two magnetic fields, one generated by electromagnetic induction caused by electric current flowing through the electric conductor placed into the loop-shaped sheath, and the other generated by electromagnetic induction caused by electric current flowing through the electrodes and the supporting bodies thereof, substantially cancel each other out or generate an overall magnetic field which is located forward of the rear end of the welding head or forward of the operator's body.

4 Claims, 2 Drawing Sheets

*PRIOR ART*

ELECTRIC SPOT WELDING HEAD

CROSS REFERENCE TO RELATED APPLICATIONS

This application claims priority from European patent application No. EP06425154.9, filed on Mar. 8, 2006, the entire disclosure of which is incorporated herein by reference.

BACKGROUND OF THE INVENTION

The present invention regards to spot welding heads of the type comprising:
a pair of electrodes supported by respective supporting bodies and movable with respect to each other between an open position and a closed position,
an actuator device to control the movement of the electrodes between the open position and the closed position,
electric conductors connecting the two electrodes to the terminals of a transformer which is located at a remote position with respect to the welding head, and
a tubular sheath portion, into which at least part of at least one of the aforesaid electrical conductors is guided, having a loop portion with ends rigidly connected to the rear ends of the two supporting bodies of the electrodes.

SUMMARY OF THE INVENTION

Electric current flowing through the electric conductor placed inside the loop portion of the aforesaid sheath is very high, of about several thousands of amperes, thereby generating a high magnetic field when the welding head is operating. Similarly electric current flowing through the two electrodes and the respective supporting elements follows a substantially annular path, thereby generating a further induced magnetic field.

Known welding heads present the aforesaid loop portion sheath extending at the rear of the welding head so that, in the case the welding head is operated manually, the generated magnetic field is relatively close to the operator's body.

In order to overcome such aforesaid drawback, the subject of the present invention is a welding head having the features described at the beginning of this description, and characterised in that said loop-shaped sheath is disposed in such a way that the magnetic field generated by electromagnetic induction caused by electric current flowing through the electric conductor placed into the loop-shaped sheath, and the magnetic field generated by electromagnetic induction caused by electric current flowing through the two electrodes and the bodies of the two electrodes, substantially cancel each other out or anyway generate an overall magnetic field sensibly reduced.

In the preferred embodiment of the invention, the aforesaid loop portion of the tubular sheath extends into a plane lying substantially parallel and side by side to the plane defined by the two electrode bodies, said loop portion being substantially centred on a median direction which is parallel and intermediate with respect to the longitudinal directions of the two electrode supporting elements.

In this way the loop portion of the sheath substantially faces the annular path defined by the electrodes and the supporting elements thereof.

Moreover, the electric conductor within said loop portion sheath is passed through by a current which moves in a direction of rotation opposite to the one followed by the current through the two electrodes.

In this way two advantages are obtained: first of all the two magnetic fields induced by the current through the electric conductor's loop portion and the one through the electrodes are opposite to each other and therefore tend to substantially cancel each other out or anyway generate a reduced overall residual magnetic field. Secondly, said residual magnetic field is anyhow in a zone placed towards the front part of the welding head and therefore more distant from the operator's body.

According to a further preferred feature, the welding head according to the present invention is provided with a protection shield on its rear side, for example made of aluminium, in order to protect more efficiently the operator thereby further dramatically decreasing the residual magnetic field generated by the current through the welding head.

BRIEF DESCRIPTION OF THE DRAWINGS

Further features and advantages of the invention will be described with reference to the attached drawings, purely by way of non-limiting example, wherein.

DETAILED DESCRIPTION OF THE INVENTION

Figure 1:
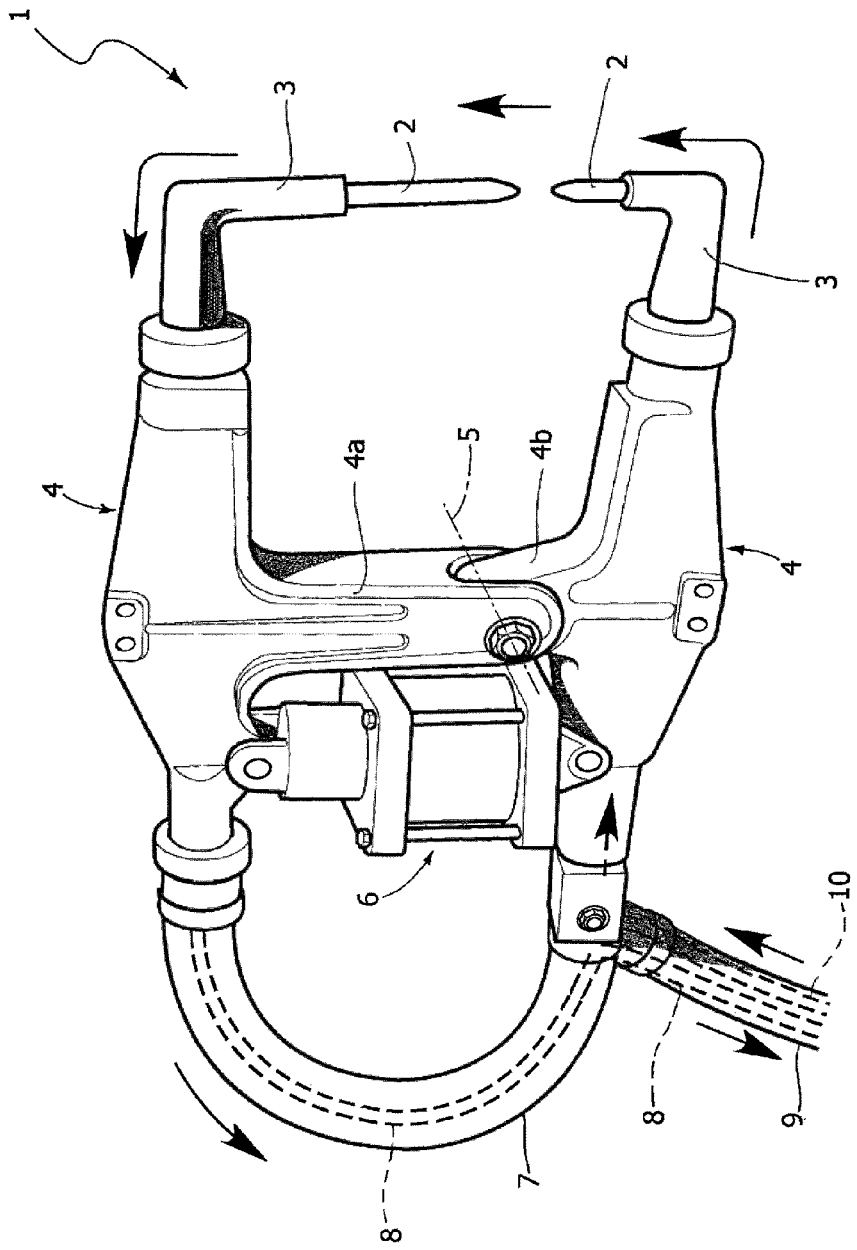
FIG. 1 is a perspective view of a welding head according to the known art.
Figure 3:
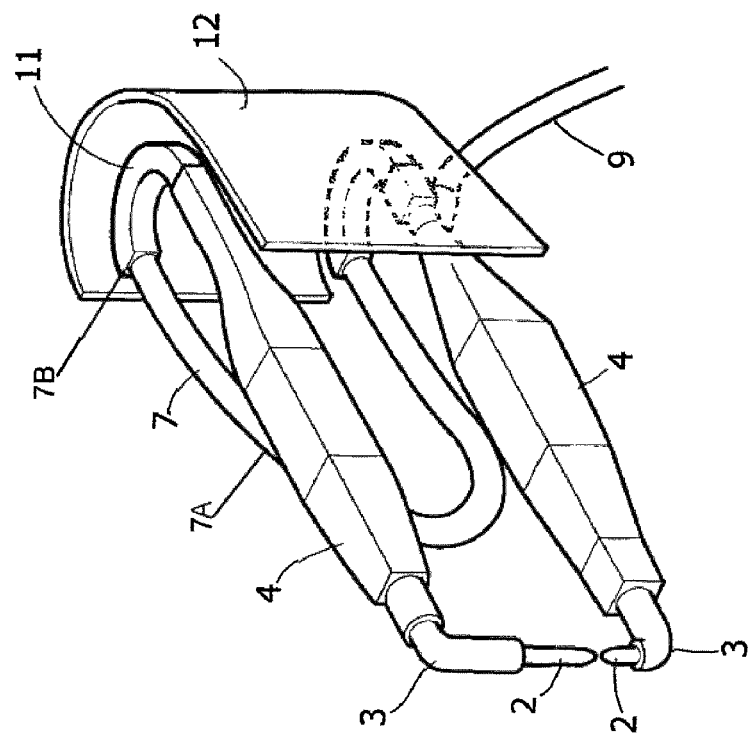
FIG. 3 shows a further embodiment of the welding head according to the invention.

In FIG. 1, reference number 1 indicates generally an electric spot welding head, of conventional type, with remote transformer (not illustrated in the drawings), suited for manual use.

The head comprises a pair of electrodes 2 opposed to each other, provided on the tip of two terminal portions 3, for example L shaped, the shape however depending on the type of electrode used for a specific operation, these terminal portions 3 projecting from the front ends of two supporting elements 4 which are of a substantially elongated shape and provided with respective appendices 4a, 4b reciprocally pivotally connected at 5.

The two electrode holding elements 4 are connected to the ends of a fluid actuator 6, for example a pneumatic cylinder, at their rear ends.

The ends of a tubular sheath 7 are rigidly connected to the two rear ends of the supporting elements 4; an electrical conductor 8 is guided into this tubular sheath 7 (only diagrammatically illustrated in the drawing), the electrical conductor 8 being electrically connected to one of the electrodes 2 and extending into another tubular sheath 9 connected to a terminal of the transformer.

A further electric conductor 10 is also guided into the tubular sheath 9 thereby connecting the other terminal of the transformer to the other electrode 2.

When the welding head is operating, electric current coming from conductor 10 (see arrows in the drawing), goes into its respective electrode 2 and afterwards from there, through the metal parts to be welded (not shown) and which are pressed between the electrodes, into the other electrode 2 and from there around the transformer through conductor 8.

Actuator 6 is activated to move electrodes between an open condition and a closed operative condition for welding. Further cables and tubes are guided into tubular sheaths 7, 9 for supplementary services such as compressed air supply to pneumatic cylinder 6 and cooling fluid for the electrodes.

As already referred above, high electric current flowing through conductor 8 generates a relatively high induced magnetic field relatively high and close to the operator's body placed behind the welding head.

Figure 2:
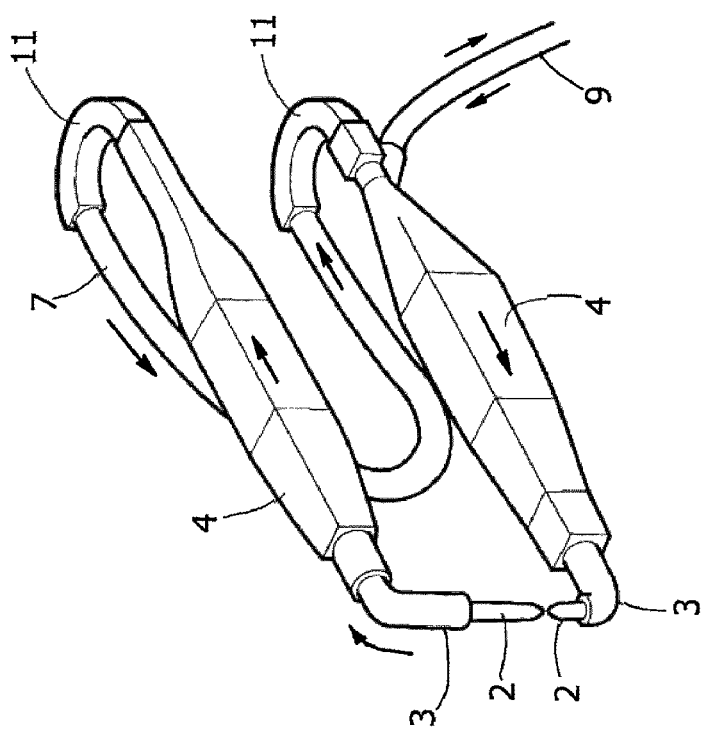
FIG. 2 is a perspective schematic view of a welding head according to the invention.

In order to avoid such a drawback, the present invention provides the welding head diagrammatically shown in FIG. 2. In this figure, parts in common with FIG. 1 are indicated with the same reference numbers. Moreover FIG. 2 is adapted to essentially show the main portions of the two electrodes and relative supporting elements 4 thereof, and for greater clarity it fails to show the pivot connection between the two electrodes and the actuator driving the two electrodes between open and closed positions. These parts, omitted in FIG. 2, can be made in any known way and, taken by themselves don't form part of the present invention. Moreover omitting these details from FIG. 2 make this one more readily understandable.

The main difference from FIG. 1 consists in that in the case of the welding head according to the invention and shown in FIG. 2, the loop-shaped tubular sheath 7 extends substantially into a plane lying parallel and side by side to the plane defined by the two electrodes' bodies and is substantially centred with respect to these electrodes, so that the sheath's loop portion 7A stands in front of the circuit defined by the two electrodes' bodies and the electrodes themselves.

As indicated by arrows in FIG. 2, electric current flows through loop portion 7A and the loop portion defined by the two electrodes respectively in two opposite directions of rotation, so that the magnetic fields induced by current flowing through conductor 8 placed into the tubular sheath 7 and through supporting elements 4 and electrodes 2 cancel each other out or anyway result in a relatively reduced residual magnetic field.

Furthermore, as it can be seen, the sheath loop portion 7 is closer to the welding head's front end and therefore lies farther from the operator's body, in the case the welding head is operated manually.

As shown in FIG. 2, the ends 7B of the sheath loop portion are connected to two connecting members 11 of tubular shape (or also of a different geometry) having a curved configuration and a relatively stiff structure, so that sheath 7 keeps substantially its configuration and its position in any condition, except for deformations caused by electrodes moving around their respective axis of articulation.

As it can be seen, sheath 7 comprises two rectilinear and parallel reciprocally spaced extensions which are connected by a curved portion. The length of the rectilinear portions may also be chosen in order to obtain the best result in terms of nullification or reduction of the overall magnetic field.

As already described, loop portion 7 is centred with respect to the median axis which is parallel and intermediate between the longitudinal directions of the electrode supporting elements, so as to face the loop portion defined by elements 4 and electrodes 2, for reducing the overall magnetic field as much as possible.

In the embodiment represented in FIG. 2, operator's safety is further increased by providing a protection shield 12, for example made of aluminium, connected to a bearing structure or to the body of one electrode.

Of course, without prejudice to the principle of the invention, the details of construction and the embodiments may vary widely with respect to what is described and illustrated herein, without thereby departing from the scope of the present invention as defined in the ensuing claims.

What is claimed is:

1. A spot welding head comprising:
   a pair of electrodes supported by respective supporting bodies and movable with respect to each other between an open position and a closed position,
   an actuator device to control the movement of the electrodes between the open position and the closed position,
   electric conductors connecting the two electrodes to the terminals of a transformer which is located at a remote position with respect to the welding head, and
   a tubular sheath portion, into which at least part of at least one electrical conductor of said electrical conductors is guided, said sheath portion having a loop portion with ends rigidly connected to the rear ends of the supporting bodies of the electrodes,
   wherein said loop portion is disposed in such a way that a magnetic field generated by electromagnetic induction caused by electric current flowing through the at least one electric conductor forming the loop portion, and a magnetic field generated by electromagnetic induction caused by electric current flowing through the electrodes and through the supporting bodies of the electrodes, generate an overall magnetic field located forwardly with respect to the rear end of the welding head or spaced forwardly away from an operator's body;
   wherein said tubular sheath portion extends into a plane lying substantially parallel and side by side to a plane defined by the bodies of the electrodes, said loop portion being substantially centered with respect to a median direction which is parallel and intermediate between the longitudinal directions of said supporting bodies, so that the loop portion faces an annular path defined by the electrodes and the supporting bodies;
   wherein the at least one electric conductor placed into said loop portion is passed through by a current moving in a direction of rotation opposite to that of the current moving through the electrodes;
   wherein the sheath portion comprises two substantially rectilinear stiff extensions, parallel and spaced from each other, each of said extensions at one end are connected together through said loop portion and at another end connected to the rear ends of the supporting bodies through two substantially stiff portions, so that a configuration and a position of said loop portion are substantially maintained.

2. The spot welding head, according to claim 1, wherein the magnetic field generated by the electric current flowing through the conductor placed into the loop-shaped sheath, and the magnetic field generated by the electric current flowing through the two electrodes and through the supporting bodies of the two electrodes, substantially cancel each other out.

3. The spot welding head, according to claim 1, further comprising a protection shield on a rear side of said welding head to protect the operator from any residual magnetic field generated by current flowing through the welding head.

4. The spot welding head, according to claim 3, wherein said shield comprises aluminum.

* * * * *

UNITED STATES PATENT AND TRADEMARK OFFICE
CERTIFICATE OF CORRECTION

| | | |
|---|---|---|
| PATENT NO. | : 7,851,723 B2 | Page 1 of 1 |
| APPLICATION NO. | : 11/683151 | |
| DATED | : December 14, 2010 | |
| INVENTOR(S) | : Massimo Di Pardo | |

It is certified that error appears in the above-identified patent and that said Letters Patent is hereby corrected as shown below:

Claim 1, at Column 4, Line 16: Delete "said sheath portion" and insert --said tubular sheath portion--

Claim 1, at Column 4, Line 34: Delete "so that the loop portion faces an" and insert --so that an outer portion of the loop portion faces an--

Claim 1, at Column 4, Line 41: Delete "said sheath portion" and insert --said tubular sheath portion--

Signed and Sealed this
Twenty-second Day of February, 2011

David J. Kappos
*Director of the United States Patent and Trademark Office*